US008428626B2

United States Patent
Pascal et al.

(10) Patent No.: US 8,428,626 B2
(45) Date of Patent: Apr. 23, 2013

(54) SELECTIVE CACHING OF REAL TIME MESSAGING THREADS

(75) Inventors: Kristin Marie Pascal, Bothell, WA (US); Andrew Evan Klonsky, Portland, OR (US); Matthew James Bailey, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 774 days.

(21) Appl. No.: 12/342,896

(22) Filed: Dec. 23, 2008

(65) Prior Publication Data

US 2010/0159944 A1 Jun. 24, 2010

(51) Int. Cl.
*H04M 3/42* (2006.01)
*G06F 15/16* (2006.01)

(52) U.S. Cl.
USPC .................. 455/466; 455/414.2; 709/206

(58) Field of Classification Search ............. 455/412.1, 455/466, 566, 414.1, 456, 414.2, 404.2; 709/206, 709/203; 370/352; 707/102
See application file for complete search history.

(56) References Cited

U.S. PATENT DOCUMENTS

| 7,885,641 B2* | 2/2011 | Tysowski .................. 455/412.1 |
| 2005/0102361 A1* | 5/2005 | Winjum et al. ............... 709/206 |
| 2005/0175021 A1* | 8/2005 | Ozugur et al. ................ 370/401 |
| 2007/0005511 A1* | 1/2007 | Martinez ........................ 705/67 |
| 2007/0049256 A1* | 3/2007 | Wassingbo ................ 455/414.1 |
| 2007/0150941 A1* | 6/2007 | Jachner ............................ 726/5 |
| 2007/0248055 A1* | 10/2007 | Jain et al. ...................... 370/331 |
| 2010/0291907 A1* | 11/2010 | MacNaughtan et al. ... 455/414.1 |

* cited by examiner

*Primary Examiner* — George Eng
*Assistant Examiner* — Nizar Sivji
(74) *Attorney, Agent, or Firm* — Turocy & Watson, LLP (57) ABSTRACT

A method is provided to process data in a wireless data exchange. The method includes exchanging data between two or more wireless devices in real time and opening a thread of communications between the wireless devices, where the thread includes one or more data exchanges between the wireless devices. When the real time messaging exchange has been established, the method identifies all or portions of the thread as potential data to store. As such data is identified, the method selectively caches the identified portions of the thread for future data retrieval.

20 Claims, 10 Drawing Sheets

SELECTIVE CACHING OF REAL TIME MESSAGING THREADS

TECHNICAL FIELD

The subject innovation relates to wireless communications and, more particularly, to store selective portions of a real time messaging thread.

BACKGROUND

As is evident in common cell phone experiences, modern communications have moved beyond basic voice capabilities. With the addition of text and picture messaging between peers, along with inclusion of rich media from both traditional and new providers of entertainment and content, mobile systems in particular have become increasingly complex. Although this technology landscape is filled with opportunity, unprecedented interoperability challenges are faced by such systems. When these systems are augmented with presence—the ability to know if and how members of one's community can be reached—and the spontaneity of Instant Messaging, there is an even more exciting dimension added to the dynamics of voice, text, and rich media exchange. Such new technologies are sometimes referred to as next generation messaging.

In general, next generation messaging includes at least Mobile Instant Messaging (IM), Presence, and Interconnect services. These services are designed to enable service providers to deliver next generation messaging and services to their customers to create highly interactive communities. Such services are offered in conjunction with the world's leading mobile and fixed-line operators, and handset manufacturers. As these companies define and deploy their core services and product lines, an in-depth appreciation of requirements of subscribers is needed. As a result, interoperability services enable a rapidly evolving market, interconnecting operator instant message (IM) networks worldwide for a fast growing customer base of operators whose combined subscriber base is over 200 million. The close cooperation between mobile operators and manufacturers together with a focus on innovation, design and customer needs will facilitate the communications industry's pursuit of true global interconnected IM communities.

Mobile instant messaging provides a platform for creative, innovative and differentiated next generation services that increase revenues, strengthen customer loyalty and build the operator's brand. The result is the ability to provide a compelling service offering to customers who value staying connected in new, meaningful ways. Presence services enable people within a community to keep connected anytime, any place. When they indicate their availability or see that their contacts are on-line, presence is a catalyst for interactive services for those users who demand an enriched communications environment. These services enable real-time, personalized next generation services, including person-to-person and person-to-computer services such as gaming, conferencing, chat rooms and real-time information services or "info-buddies." Integrating with fixed and mobile operators' networks or IM service cores, presence services also works from within IM core services to power fixed-mobile convergence and cross-network presence services. Instant message interconnectivity is essential in enabling operators to offer their customers the immediacy of instant messaging to freely communicate across multiple IM communities—mobile and fixed. Next generation messaging services are the driving force behind the interoperability activities worldwide and provides operators with a global neutral IM hub connecting all major IM components.

Although there is much power and utility provided by the set of services in next generation messaging, other aspects of the services are lacking in some cases. For instance, real time messaging is often conducted in text and in a rapid manner. Sometimes two or more parties are texting and sending other data in real time. In many cases, it might be desirable to recall data from a real time session yet currently, there is not a convenient manner in which to identify let alone save desired real time messaging information.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methods are provided to enable selective caching of real time data such as mobile instant messaging data. As communications occur between users and/or between users and machines, data that is present in a conversation or exchanged between devices can be marked in real time. The marked or selected data is then conveniently cached in memory where it can be recalled at a later time. In one example, selective caching of portions of a messaging thread is provided. This allows users to mark a potion (or portions) of a Next Generation Messaging (NGM) messaging thread for persistence in memory. This can facilitate easy access to the marked portions of the threaded message at a later time. One convenient way to mark a conversation for example is to merely use a text symbol (or voice command) to indicate which portion of a real time thread to cache. For example, using an "!" (e.g., exclamation point) symbol to mark the third thread of a message exchange to be cached. It is noted that the entire portion of a thread can be saved and/or portions within a thread can be selected for caching in memory.

Selective caching can further facilitate persistence of the marked portion where the thread is cleared (e.g., the conversation is still open between participants but the content of the thread is wiped clean) and/or where the thread is deleted (e.g., the conversation is closed with or without clearing the content of the thread). For example, a user can be in a group threaded conversation with another employee and supervisor, where supervisor can send out a contact phone number which the user can mark for storage. This marked content is saved when the user clears the rest of the conversation later that day. The user can access the stored content that evening when sending out an interview invite to another party for example.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF DRAWINGS

FIGS. 6-10 illustrate example systems that can be employed with selective caching of real time message exchanges.

DETAILED DESCRIPTION

Systems and methods are provided to facilitate data exchange in a real time wireless messaging environment. In one aspect, a method is provided to process data in a wireless data exchange. This includes employing a processor to control access to a wireless device. The method also includes exchanging data between two or more wireless devices in real time and opening a thread of communications between the wireless devices, where the thread includes one or more data exchanges between the wireless devices. When the real time messaging exchange has been established, the method identifies all or portions of the thread as potential data to store. As such data is identified, the method selectively caches the identified portions of the thread for future data retrieval.

As used in this application, the terms "component," "system," "platform," "cache," "mark," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
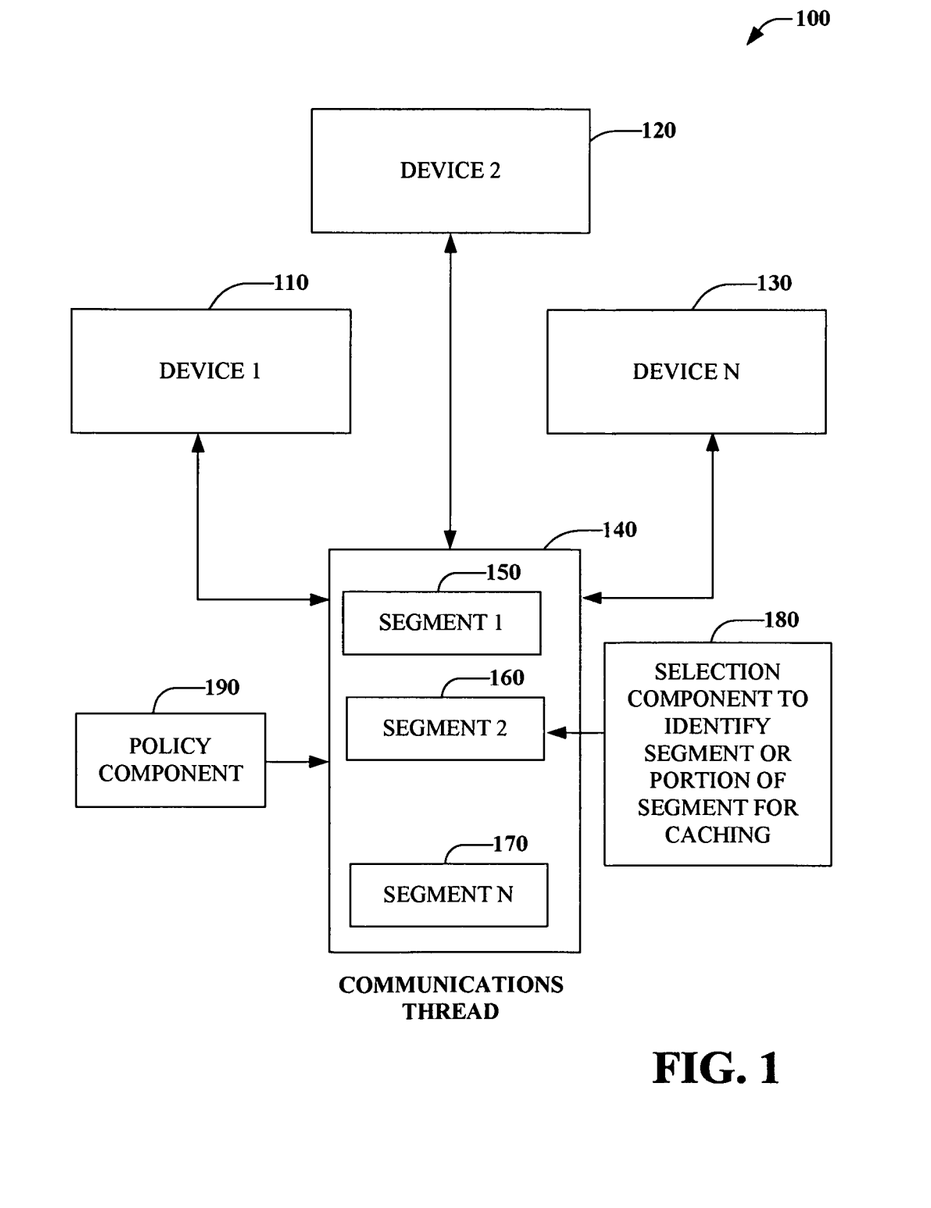
FIG. 1 a schematic block diagram of a mobile wireless system where selective portions of real time message or data exchanges are identified and cached for later retrieval.

Referring initially to FIG. 1, a system 100 illustrates a mobile wireless environment where selective portions of real time message or data exchanges are identified and cached for later retrieval. The system 100 includes two or more devices 110-130 that are employed in a real time message exchange in what is typically a wireless transfer of data. The message exchange includes a communications thread 140 having one or more segments 160-170 of communications. As used herein, the term thread implies an open dialog or electronic window on one or more of the devices 110-130 that shows and exchange of substantially real time data. For example, the communications thread 140 might include an instant message exchange between devices 110-130, where each segment 150-170 represents dialog (e.g., text message) or information exchange (e.g., posting of an image or music/video clip) sent from one or more of the devices. For instance, segment 150 may be a text message from a first user employing device 110 whereas segment 160 is from a second user that employs device 120. As can be appreciated, one device 110-130 could generate all the segments 150-170 or multiple devices could create segments and are respectively in no particular order (e.g., device 130 could send segment 150 or first message whereas device 110 sends subsequent messages and so forth).

A selection component 180 is employed to identify a segment 150-170 (or a portion of a segment) to be selectively cached by a processor associated with the respective devices 110-130. For purposes of brevity, only one selection component 180 is shown but each of the devices 110-130 can have their own selection component to enable each respective user to cache information as desired. Similarly, a policy component 190 is shown that can be employed to set up automatic rules for selecting or identifying data to be cached and stored on the devices 110-130. As with the selection component 180, an individual policy component 190 can be configured for each device 110-130. In general, the selection component 180 can mark or identify any portion of the thread 140 for caching on the devices 110-130. The selection can include indicating an individual segment such as shown at 160 as marking the thread to be stored. The selection can also including marking or identifying within a thread 150-170 such as highlighting a small set of text within a larger body of text in a segment. Also, more than one segment 150-170 can be selected for storage on the device.

It is noted that storage of selected segment or segment portions can occur on the respective devices 110-130 and/or can be stored on servers associated with the devices. This can include temporarily caching information on the device and later downloading to the server for more permanent storage if desired. It is further noted that the selection component 180 can use substantially any gesture or symbol to identify a segment or portion thereof. This can include using a symbol (e.g., !, @, #, $, *, and so forth). Drag and drop actions by a cursor component (not shown) can be employed by the selection component 180 along with biometric commands such as voice commands (e.g., save segment four), touch screen selections (e.g., use finger to drag over desired text or other data for selection), or substantially any type of indication from the user that directs the devices 110-130 on which portion of the communications thread 140 is desirable to be saved. While acts such as identifying a thread or portions of a thread can be achieved via a textual or biometric gesture, other features can also be provided. For example, users can "un-cache" messages at any time if desired. Thus, at a high level, users can go to a specific message in a conversation that was previously saved (or select the message through a "saved messages" area), and choose to "un-save or un-cache" the respective message. As can be appreciated, groups of messages can also be selected and removed from the cache or other memory in a similar manner.

In general, the system 100 enables selective caching of real time data such as mobile instant messaging data. As communications occur between users and/or between users and devices 110-130, data that is present in a conversation or exchanged between devices can be marked in real time. The marked or selected data is then conveniently cached in memory (on the devices and/or remote servers) where it can be recalled at a later time. In one example, selective caching of portions of the messaging thread 140 is provided. This allows users to mark a potion (or portions) of a Next Generation Messaging (NGM) messaging thread for persistence in memory. This can facilitate easy access to the marked portions of the threaded message at a later time. One convenient way to mark a conversation for example is to merely use a text symbol (or voice command) to indicate which portion of a real time thread 150-170 to cache. For example, using a "%" (e.g., percent) symbol to mark the third thread 170 of a message exchange to be cached. It is noted that the entire portion of a thread 150-170 can be saved and/or portions within a thread can be selected for caching in memory.

Selective caching can further facilitate persistence of the marked portion where the thread is cleared (e.g., the conversation is still open between participants but the content of the thread is wiped clean) and/or where the thread is deleted (e.g., the conversation is closed with or without clearing the content of the thread). For example, a user can be in a group threaded conversation with another employee and supervisor at 140, where supervisor can send out a contact phone number which the user can mark for storage. This marked content is saved when the user clears the rest of the conversation later that day. The user can access the selected content that evening when sending out an interview invite to another party for example. In another aspect, a system 100 for real time message exchanges is provided. The system includes means for initiating a message dialog (e.g., devices 110-130) and means for conducting a conversation within the message dialog (e.g., communications thread 140). The system 100 also includes means for selecting portions of the conversation in the message dialog (e.g., selection component 180) and means for automatically storing the portions of the conversation (e.g., policy component 190).

Figure 2:
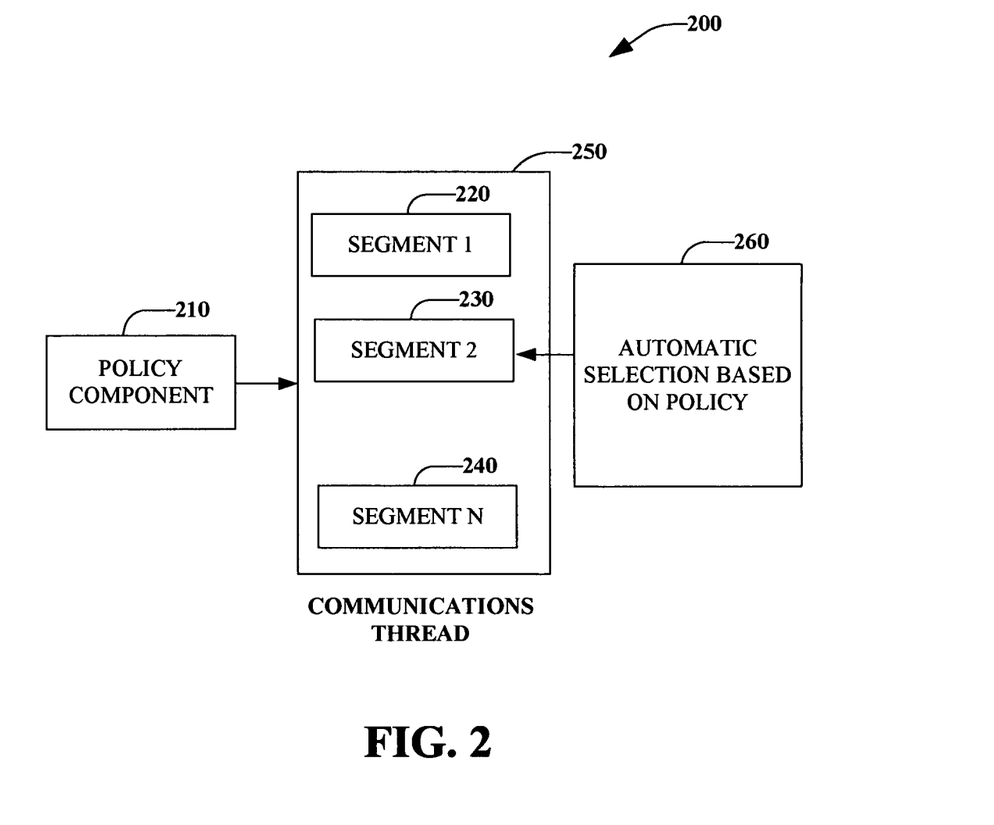
FIG. 2 is a block diagram of a system that employs automatic selection components based in part on predetermined policy or learning.

FIG. 2 is a system 200 that employs automatic selection components based in part on predetermined policy or learning. In this aspect, particular rules or policies can be preconfigured via a policy component 210 to determine how often or when particular segments 220-240 are automatically cached in a thread 250. Thus, an automatic selection component 260 is provided to cache one or more segments 220-240 (or portions thereof) based upon rules or other considerations stored in the policy component 210. One example rule or policy could be to automatically cache all data from a particular user. Another policy could be to store any detected cell phone number that is not already found in a user's address book. Yet another policy could be to cache any detected audio or video file or always cache detected images. Other policies may apply to groups of users. For example, whenever these four individuals text message with me, save all comments from user 1 or save all comments from the group and so forth.

In a more elaborate aspect, the policy component 210 may include intelligent aspects such as classifiers that analyze message data exchanges based on observed or detected patterns of usage. This can include an inference component (not shown) that further enhances automated caching aspects utilizing, in part, inference based schemes to facilitate inferring automated policies 210. For example, a learning component may detect over time that whenever exchanges are with a particular user or regarding a particular subject, that a user always decides to cache data associated with the respective message exchange. Thus, an automated policy can be setup via the learning to always capture the segment or portion thereof. The classifiers can be implemented via any suitable machine learning based technique or statistical-based techniques or probabilistic-based techniques or fuzzy logic techniques. Specifically, these components can implement models based upon learning processes (e.g., confidence, inference). For example, a parameter adjustment model can be generated via an automatic classifier system.

A support vector machine (SVM) is an example of a classifier that can be employed. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of usage, access, storage, or denial. Classifiers can be explicitly trained (e.g., via a generic training data) as well as implicitly trained (e.g., via observing user behavior, receiving extrinsic information). For example, SVM's can be configured via a learning or training phase within a classifier constructor. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Figure 3:
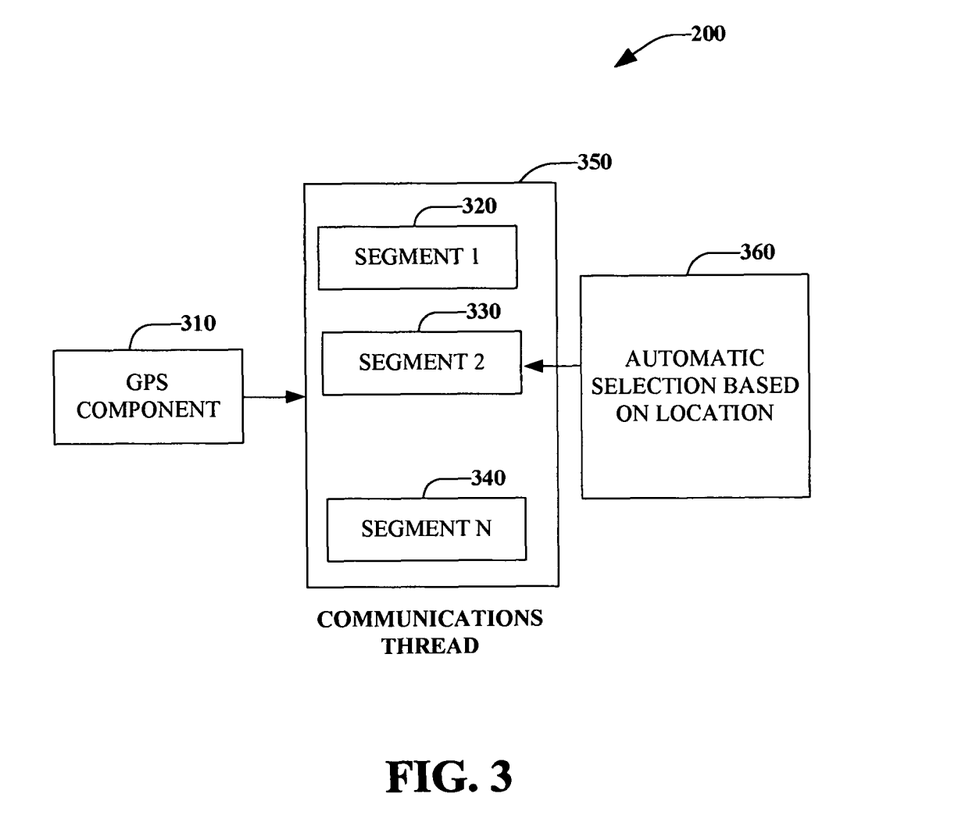
FIG. 3 is a block diagram of a system that employs automatic data selection in a message exchange based in part on location.

FIG. 3 is a system 300 that employs automatic data selection in a message exchange based in part on location. In this aspect, particular rules or policies applied via a global positioning system (GPS) 310 to determine how often or when particular segments 320-340 are automatically cached in a thread 350. Thus, an automatic selection component 360 is provided to cache one or more segments 320-340 (or portions thereof) based upon detected locations of the GPS 310. The GPS component 310 can also be employed in conjunction with the policy component described above. For example, a policy could be to always cache message segments when a person is in a given location such as a room in their home. Another policy may be to cache segments that are associated with messages that may be received in a particular location such as ads or coupons that may be pushed automatically from a retail outlet for example. Still yet other location policies may determine that when a person is traveling in their car that they would want message exchanges saved. Substantially any type of policy that automatically saves segments or portions thereof can be employed. Yet another policy example includes work situations. Thus, if a user is detected in a particular meeting room, they may want certain message exchanges saved. In a more detailed example, a policy may be configured that when a user is detected in a particular room AND a particular user is exchanging messages with them, that they would want those particular messages automatically captured and saved. Thus, Boolean combinations of policies and/or detected locations, and/or learned policies can be applied to automatically determine real time message data to be stored for a given user.

Figure 4:
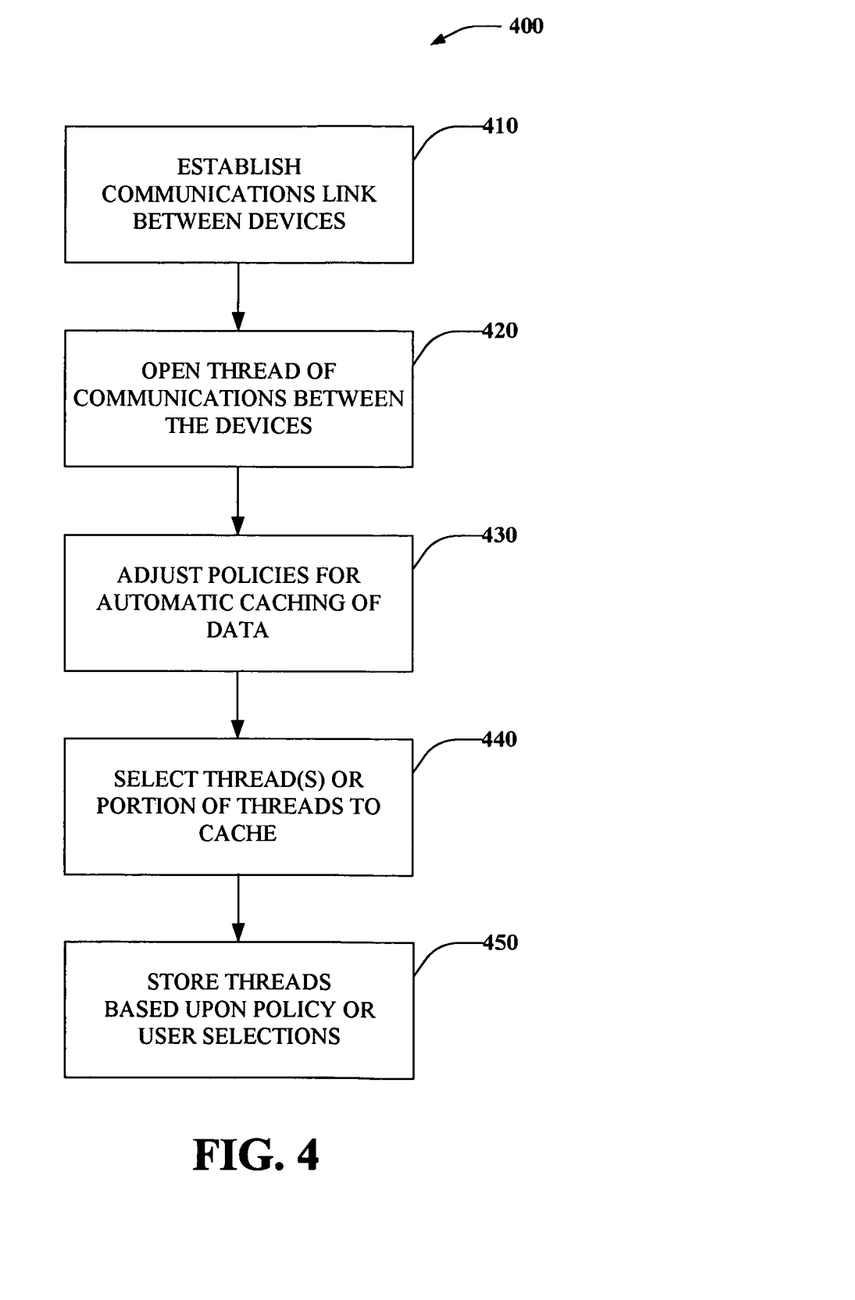
FIG. 4 is a flow diagram illustrating a method that utilizes manual or automatic selection to cache portions of a real time message exchange.

FIG. 4 is a method 400 that utilizes manual or automatic selection to cache portions of a real time message exchange. Proceeding to 410, a communications link is established between devices. This can include real time data exchanges between mobile devices, a mobile device and a desktop device, and between various combinations thereof. In general, a real time dialog or other type thread should be opened between parties in order to exchange data between devices. At 420, a thread is opened that establishes a real time communications session (e.g., instant message session) between the devices. This can include providing an interface for each party to the thread. It is noted, that each device may present a different interface or display in order to exchange data with the respective thread. This may include providing text boxes for typing or speaking instant message data for example.

Proceeding to 430, one or more policies can be set or adjusted to enable the automated caching of data. As previously described, manually created policies or learned policies can be established that automatically cache and store real time message data. Such policies can also be implemented in view of a detected location as previously described. At 440, one or more threads are selected for storage to a cache or other memory component. As noted previously, such selection can be effectuated via message characters and/or via one or more biometric gestures (e.g., voice or touch screen display). Such selection can also include selecting a portion of a particular message segment (e.g., save the selected three words of the previous four sentences from the indicated segment). At 450, after the segment or portion has been selected in 440, the thread or thread portion is cached. This can include caching based upon manual selection of a real time exchange and/or can include automated actions to select and consequently store the respective data. Such data can include text, audio, video, images, files, or substantially any type of data that can be exchanged in substantially real time among users.

Figure 5:
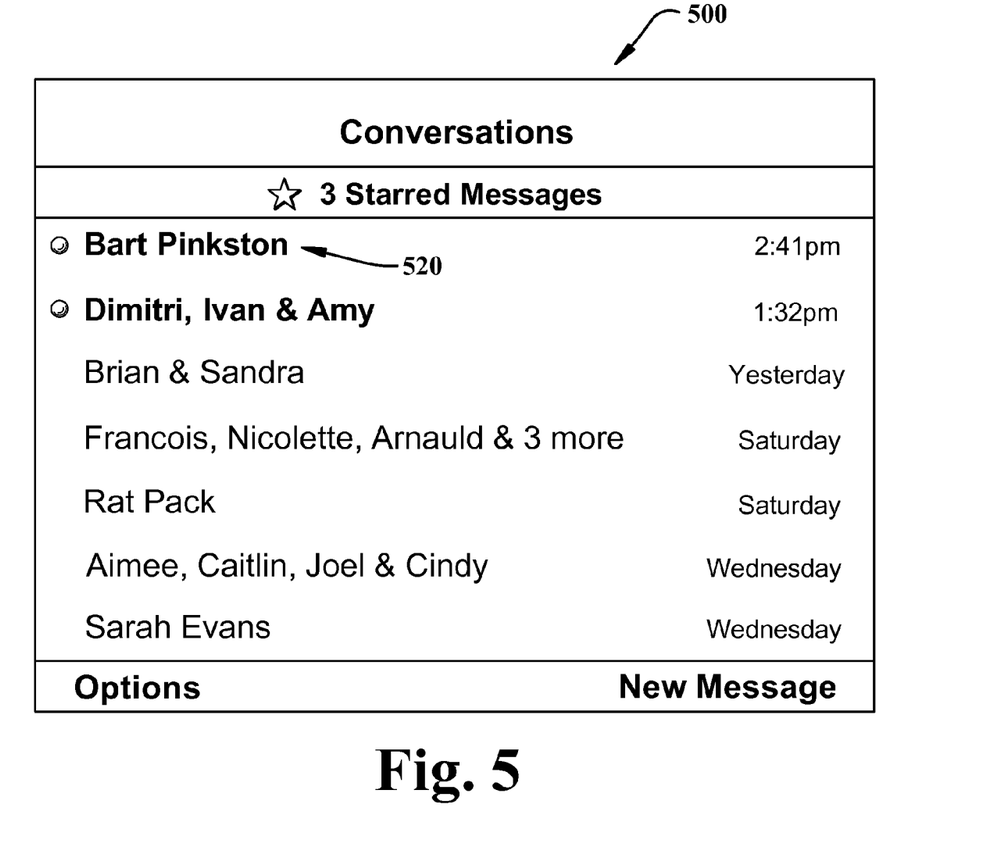
FIGS. 5-6 are diagrams illustrating example portions of a message thread that have been selected and cached.
Figure 6:
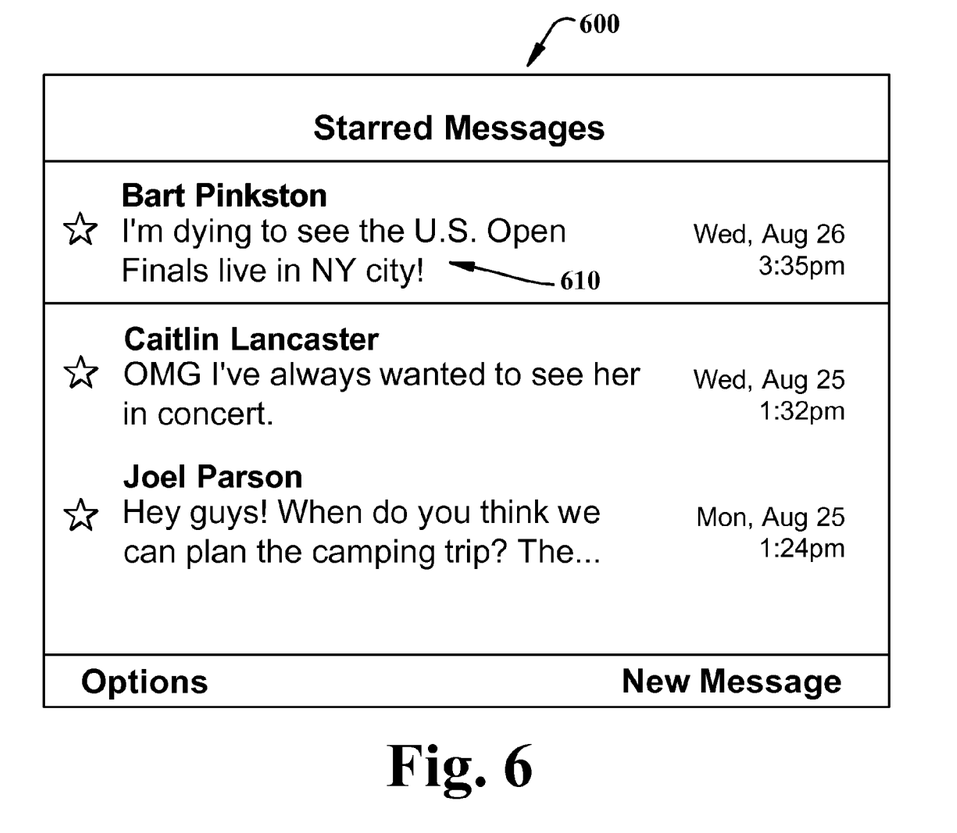

FIGS. 5-6 are diagrams illustrating example portions of a message thread that have been selected and cached. With respect to FIG. 5, a display 500 indicates that there are a plurality of messages that have been cached and having one or more portions saved from a previous real time message exchange. For example, referring to FIG. 6, a "*" (star symbol) is employed to enable users to indicate which portion of a real time message thread in which to save. As shown at 610, a saved portion of a dialog correlates to a previous conversation thread 520 depicted back at FIG. 5. As can be appreciated, a plurality of manual or automated storage of threads or portions of threads can be captured. As can be appreciated, substantially any type of symbol or other indication can be employed to mark or select a given segment, segments, or portion thereof.

Figure 7:
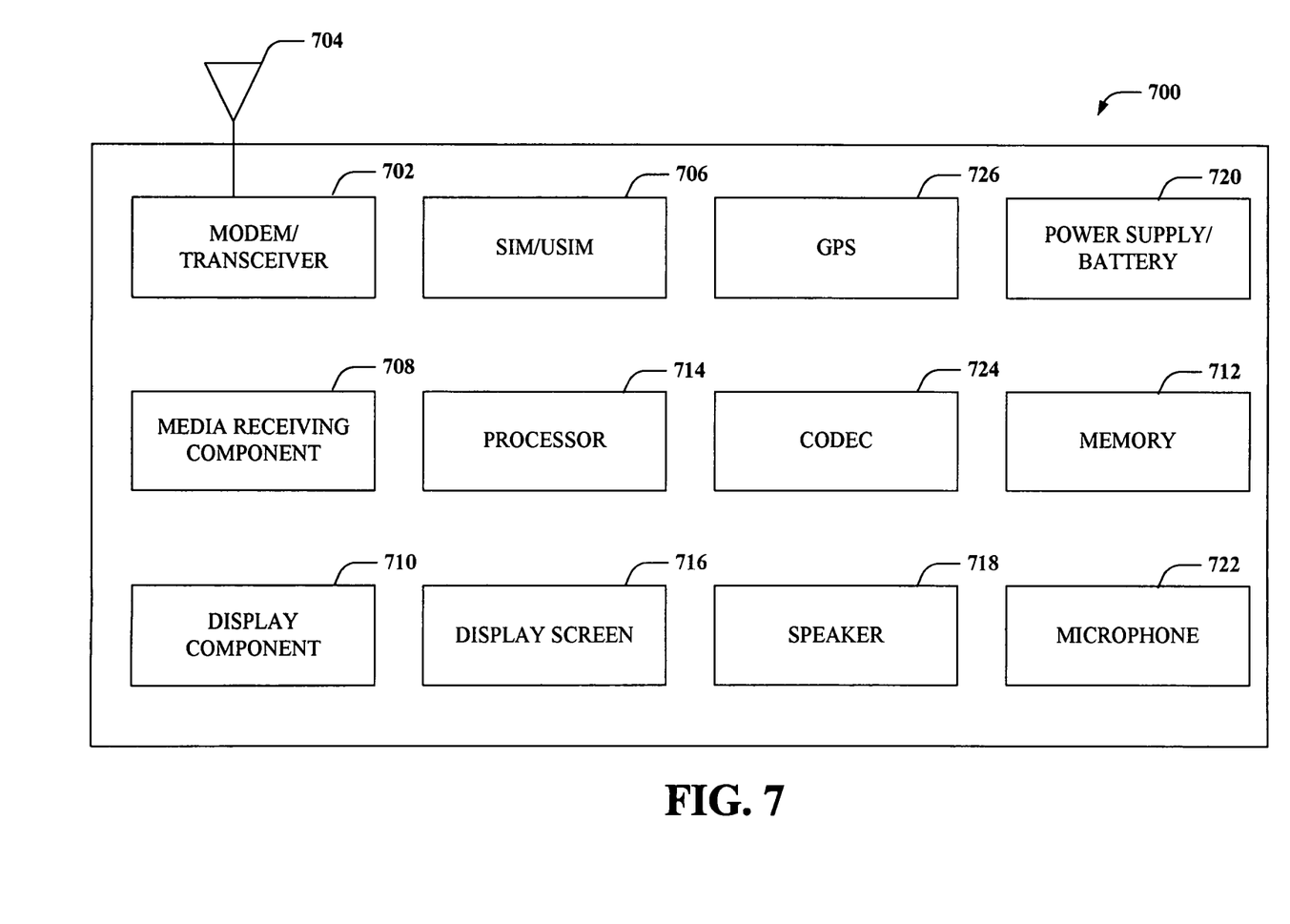

FIG. 7 illustrates an additional or alternative example embodiment of a wireless system that can implement features and aspects described herein and operated in accordance with such features and aspects. The example embodiment 700 can include a modem 702 that can wirelessly communicate with a wide area network, for example, employing a 2G/3G/3.5G/4G wireless connection. As an example, the modem 702 can be a wireless wide area network (WWAN) modem/transceiver such as a GPRS/EDGE/CDMA/UMTS/HSPA/LTE modem that can transfer digital images (or other media files) and/or control data. Moreover, the modem 702 can operate in any of the commonly used wireless spectrum bands. As an example, the modem 702 can be IPv6 (Internet Protocol version 6) enabled. It can be appreciated that the modem 702 can be embedded in the system 700 or external to the system and can be connected to an antenna 704 to receive and/or transmit data. The antenna 704 can be external or internal. Moreover, the modem 702 can receive instructions sent by a remote user (e.g. system subscriber) over a network, e.g, a mobile network platform that serves a network of deployed access points, to change one or more settings and/or perform one or more functions on the example system 700, for example, load, delete or play a file. Furthermore, the modem 702 can also be configured to receive wireless alerts (SMS, Image)/broadcast from a mobile network platform. Additionally, the example system 700 of a can include a SIM (Subscriber Identity Module) or USIM (Universal Subscriber Identity Module) 706 associated with the system users account subscription. The SIM or USIM 706 can be prepaid, flat rate monthly, or usage based. Further, the SIM or USIM 706 may need to be a locked to the specific type of device (e.g., a wireless digital media that employs a WWAN modem) to prevent it from being used in a mobile phone or wireless data device to prevent network abuse if lower rates, including flat rate, are offered to the system subscribers.

A media receiving component 708 can receive media files, e.g., content(s), sent to the example system 700 through an access point via the modem 702. Received media files can be displayed through display component 7010. The modem 702 can include control functions to enable communication with the WWAN and transfer of data in the downlink. The modem 702 can be downlink enabled and can optionally allow the ability to transfer data in the uplink (UL) direction beyond control channels. For example, the system 700 can transfer data associated with available free space in memory 7012 to a mobile network platform in the UL. Further, the modem 702 can be configured to allow network control such that transfer of data (scheduling) could occur at various times of the day based on network/sector loading due to traffic and propagation conditions and/or based on user preferences. Further, the modem 702 can be configured to work on a prepaid condition or active account or unlimited usage account.

The system 700 can typically include a processor 714 that can be a processor based controller chip. Specifically, the processor 714 can be a processor dedicated to analyzing information received by modem 702 and/or generating information for transmission on the UL, a processor that controls one or more components of the system 700, a processor that facilitates output of media files on a display screen 1016 or via speaker 718, and/or a processor that both analyzes information received by modem 702, generates information for transmission on the UL, controls one or more components of the system 700 and facilitates output of media files on a display screen 716 or via speaker 714.

The system 700 can additionally comprise memory 712 that is operatively coupled to processor 714 and that can store data to be transmitted, received data, data associated with analyzed signal and/or interference strength, information related to an assigned channel, power, rate, or the like, and any other suitable information for estimating a channel and communicating via the channel. Memory 712 can additionally store media files received from a sender over a network. Further, memory 712 can also store user preferences and/or predefined user settings. In one example, memory 712 can be partitioned, such that locally downloaded media files (e.g. downloaded by an end user) are stored in one partition and remotely downloaded media files (e.g., content(s) are stored in another partition. A number of program modules can be stored in the memory 712, including an operating system, one or more application programs, other program modules and/or program data. It is appreciated that the aspects described herein can be implemented with various commercially available operating systems or combinations of operating systems.

Additionally, a system bus (not shown) can be employed to couple system components including, but not limited to, the system memory 712 to the processor 714. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 716 and/or audio files can be played via the speaker 718. It can be appreciated that the media files stored in the memory 712 can also be received via ports such as, but not limited to, USB, USB2, 1395, SD card, Compact Flash, etc. Additionally, system 700 can include a power supply/battery 720 that can be employed to power the system. As an example, power management techniques can be employed to save battery power, such that the battery can last longer between recharge cycles.

An end user can enter commands and information through one or more wired/wireless input devices, e.g., a keyboard, a pointing device, such as a mouse and/or a touch screen display 716. A microphone 722 can also be employed to enter data. For example, the end user can employ the microphone 722 to enter an audio clip associated with an image. These and other input devices are often connected to the processor 714 through an input device interface (not shown) that is coupled to a system bus, but can be connected by other interfaces, such as a parallel port, an IEEE 1394 serial port, a game port, a USB port, an IR interface, and so forth The system 700 can further include a codec 724 that can be employed encode and/or decode digital data. The codec 724 can employ most any compression and/or decompression algorithm to compress/decompress a received media file. Furthermore, the system 700 can include a GPS (global positioning system) 726 that can be employed to determine the current geographical coordinates of the example the system 700. The GPS 726 can include a separate GPS antenna (not shown) or employ the antenna 704 to communicate with a GPS satellite. In one example, the example embodiment system 700 can receive broadcast warnings, emergency alerts, weather alerts, etc. based on the current coordinates.

In addition, the example embodiment 700 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
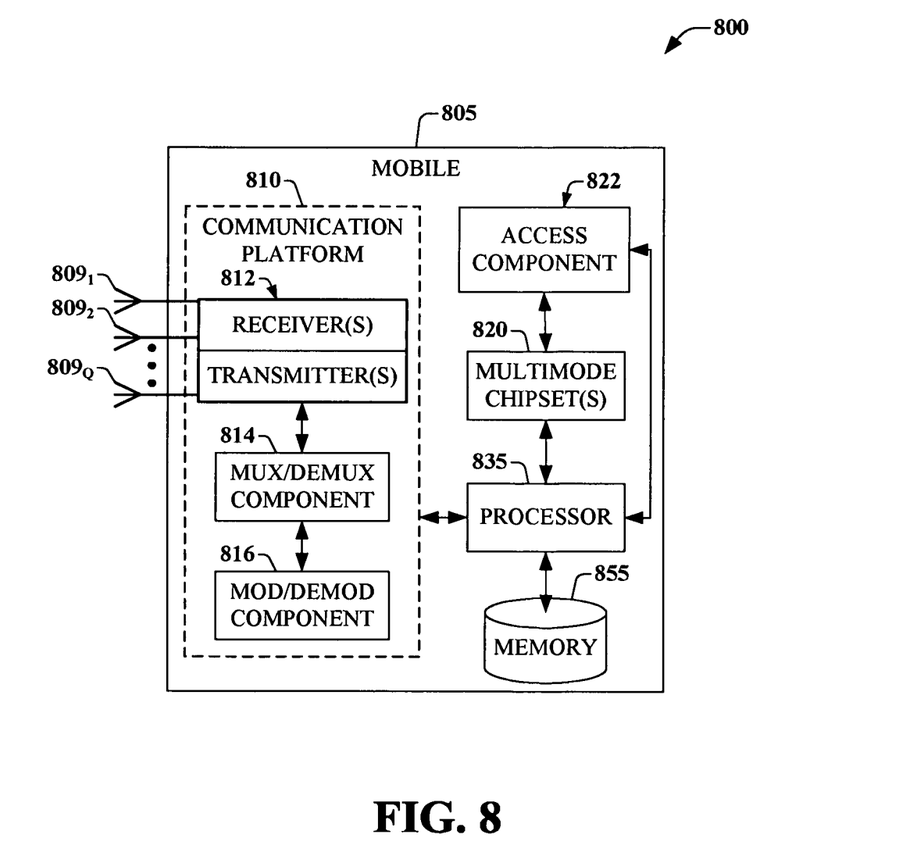
Figure 9:
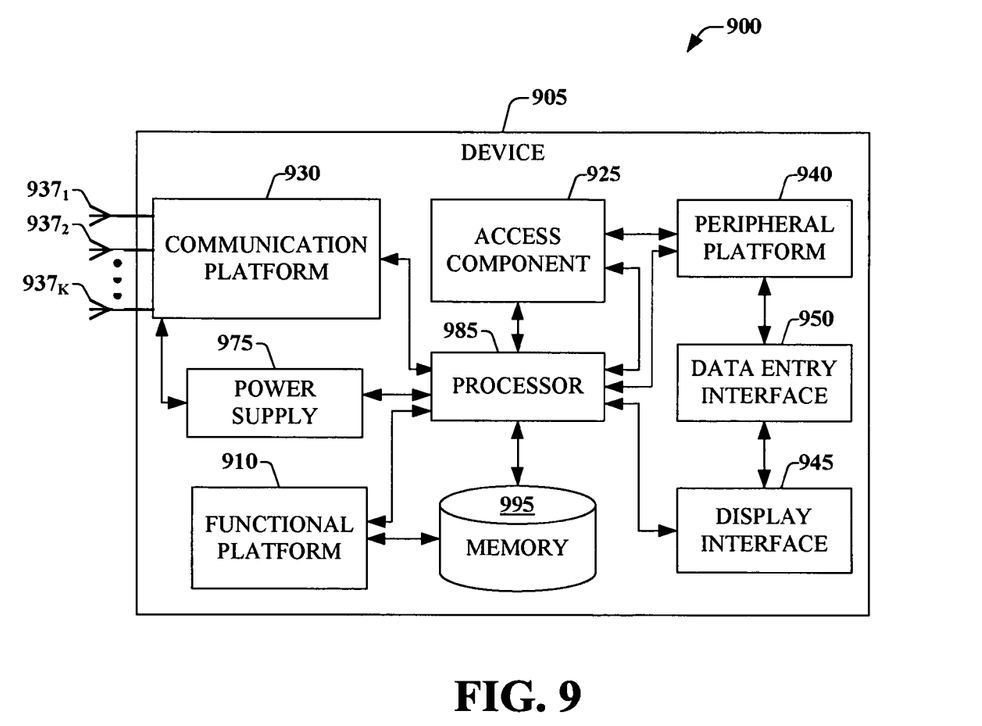
Figure 10:
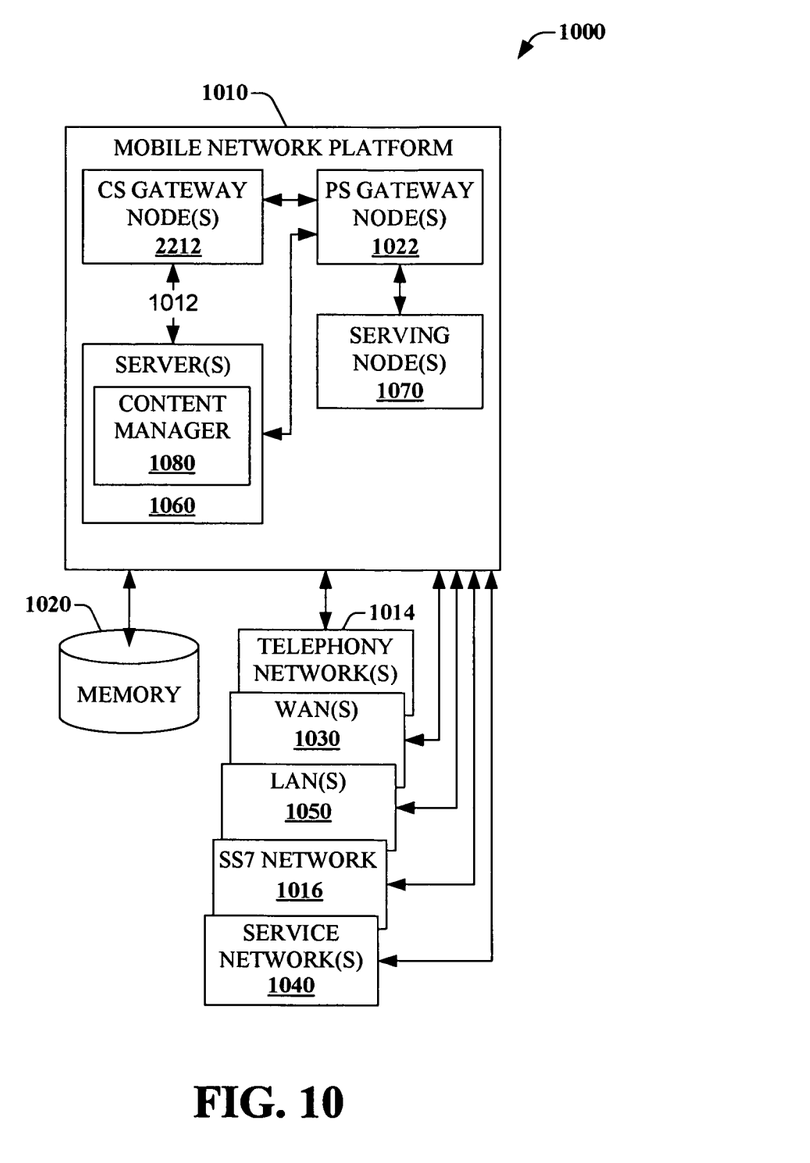

To provide further context for various aspects of the subject specification, FIG. 8 illustrates a block diagram of an example embodiment 800 of a mobile 805 that can deliver content(s) or signaling directed to a device in accordance with aspects described herein. Additionally, FIG. 9 presents a block diagram of an example embodiment 900 of a non-mobile device 905, which can be provisioned through a non-mobile network platform and can be employed to convey content(s) or signaling to a device in accordance with aspects described herein. Furthermore, FIG. 10 presents an example embodiment 1000 of a mobile network platform 1010 which can provide content management service in accordance with aspects described herein.

In mobile 805 of FIG. 8, which can be a multimode access terminal, a set of antennas $809_1$-$809_Q$ (Q is a positive integer) can receive and transmit signal(s) from and to wireless devices like access points, access terminals, wireless ports and routers, and so forth that operate in a radio access network. It should be appreciated that antennas $809_1$-$809_Q$ are a part of communication platform 810, which comprises electronic components and associated circuitry that provide for processing and manipulation of received signal(s) and signal(s) to be transmitted; e.g., receivers and transmitters 812, mux/demux component 814, and mod/demod component 816.

In the system 800, multimode operation chipset(s) 820 allows mobile 805 to operate in multiple communication modes in accordance with disparate technical specification for wireless technologies. In an aspect, multimode operation chipset(s) 820 utilizes communication platform 810 in accordance with a specific mode of operation (e.g., voice, Global Positioning System (GPS)). In another aspect, multimode operation chipset(s) 820 can be scheduled to operate concurrently (e.g., when Q>1) in various modes or within a multi-task paradigm.

Mobile 805 includes access component 822 and can convey content(s) or signaling in accordance with aspects described herein. It should be appreciated that access component 822, can include a display interface that render content in accordance with aspects of an interface component (not shown) that resides within access component 822.

Mobile 805 also includes a processor 835 configured to confer functionality, at least in part, to substantially any electronic component within mobile 805, in accordance with aspects of the subject innovation. As an example, processor 835 can be configured to execute, at least in part, instructions in multimode operation chipset(s) that afford multimode communication through mobile 805 such as concurrent or multitask operation of two or more chipset(s). As another example, processor 835 can facilitate mobile 805 to receive and convey signaling and content(s) (e.g., various data flows) that are part of an active management act initiated by a subscriber that operates mobile 805, or an approval cycle associated with auxiliary subscribers (e.g., secondary subscriber, tertiary subscriber . . . ). Moreover, processor 835 facilitates mobile 805 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 855 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 800, processor 835 is functionally coupled (e.g., through a memory bus) to memory 855 in order to store and retrieve information necessary to operate and/or confer functionality, at least in part, to communication platform 810, multimode operation chipset(s) 820, access component 822, and substantially any other operational aspects of multimode mobile 805.

FIG. 9 is a block diagram of an example system 900 of a non-mobile device that can convey content(s) exploit various aspects of content transaction(s) as described herein. Device 905 includes a functional platform 910 that comprises a set of components (not shown) that provide, at least in part, one or more specific functionalities of the non-mobile device 905. Additionally, non-mobile device 905 includes an access component 925 that operates in accordance with aspects described hereinbefore. Moreover, in an aspect, non-mobile device 905 can include a communication platform 930 that can provide wireless communication capabilities in addition, or alternatively, to connectivity of non-mobile device 905 through wired links (e.g., Ethernet, USB, GPIB, RS-232, FireWire, optical or coaxial cable connection to a network interface such as network interface, or router (not shown)). With respect to wireless capability, in non-mobile device 905, which can be a multimode access terminal, a set of antennas $937_1$-$937_P$ (P is a positive integer) can receive and transmit signal(s) from and to wireless devices like access points, access terminals, wireless ports and routers, etc., that operate in a radio access network. Communication platform 930 can exploit the set of P antennas $937_1$-$937_K$, (K is a positive integer) to establish communication within various modes such as single-input single-output, or multiple-input multiple output.

Additionally, in non-mobile device 905, a peripheral component 940 can include, or facilitate connection to, additional devices such as printer(s), media player(s), wireless router(s) (e.g., network interface), biometrics touch-pad(s), etc. In an aspect, to afford such connectivity, peripheral component 940 can include jacks for one or more of Ethernet, USB, GPIB, RS-232, FireWire, optical or coaxial cable connectors. Additionally, display interface 945 can be a part of functional platform 910 (e.g., when non-mobile device 905 is a PC, an IPTV interface, a mobile, a back projector component, a data projector . . . ). In an aspect, display interface 945 can be a liquid crystal display (LCD), a plasma panel, a monolithic thin-film based electro-chromic display, and so on. It should be appreciated that rendering areas in display interface 945 can be substantially disparate.

It should be appreciated that non-mobile device 905 also can include a data entry interface 950 that can allow an end user to perform at least one of (i) command non-mobile device via configuration of functional platform 910, (ii) deliver content(s) or signaling directed in accordance to aspects described herein, or (iii) generate content(s) (e.g., images via a built-in camera) or directive(s) for subscribed content.

Power supply 975 can power-up device 905 and substantially any component included thereon. It should be appreciated that alternative or additional embodiments of device 905 may not include power supply 975 and be powered via an attachment to a conventional power grid.

In the system 900, non-mobile device 905 includes processor 985 which can be functionally coupled (e.g., through a memory bus) to memory 995 in order to store and retrieve information to operate and/or confer functionality, at least in part, to access component 925, and substantially any component(s) thereon in accordance with aspects described herein; functional platform 910; communication platform 930 and substantially any other component of non-mobile device 905. With respect to access component 925, and components thereon, processor 985 can be configured to execute access protocols to convey credentials and gains access to a content management service to convey multimedia content(s) or signaling to a subscribed WDMF. In addition, in connection with communication platform 930, processor 985 is configured to confer functionality, at least in part, to substantially any electronic component within communication platform 930. Moreover, processor 985 facilitates communication platform 930 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 995 also can retain multimedia content(s) or security credentials (e.g., passwords, encryption keys, digital certificates) that facilitate access to a content management service. In addition, memory 995 can store data structures (e.g., metadata); code structure(s) (e.g., modules, objects, classes, procedures) or instructions, or substantially any type of software or firmware that processor 985 can execute to provide functionality associated with functional platform 930; network or device information like policies and specifications; code sequences for scrambling, spreading and pilot (e.g., reference signal(s)) transmission; and so on.

As indicate supra, FIG. 10 presents an example system 1000 of a mobile network platform 1010 which can provide a content management service for content(s) and signaling in accordance with aspects described herein. Generally, mobile network platform 1010 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1010 can be employed to effect communication among sources of content(s) and subscriber files in accordance with aspects described herein.

With respect to CS communication, mobile network platform 1010 includes CS gateway node(s) 1012 which can interface CS traffic received from legacy networks such as telephony network(s) 1014 (e.g., public switched telephone network (PSTN), or public land mobile network (PLMN)) or a SS7 network 1016. Circuit switched gateway node(s) 1012 can authorize and authenticate traffic (e.g., voice) arising from such networks. Additionally, CS gateway node(s) 1012 can access mobility, or roaming, data generated through SS7 network 2260; for instance, mobility data stored in a visitation location register (VLR), which can reside in memory 1020. Moreover, CS gateway node(s) 1012 interfaces CS-based traffic and signaling and gateway node(s) 1022. As an example, in a 3GPP UMTS network, CS gateway node(s) 1012 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1022 can authorize and authenticate PS-based data sessions with served mobile devices, non-mobile devices, and access points. Data sessions can include traffic, or content(s), exchange with networks external to the mobile network platform 1010, such as wide area network(s) (WANs) 1030 or service network(s) 1040; it should be appreciated that local area network(s) (LANs) 1050 can also be interfaced with mobile network platform 1010 through PS gateway node(s) 1022. Packet-switched gateway node(s) 1022 generates packet data contexts when a data session is established. To that end, in an aspect, PS gateway node(s) 1022 can include a tunnel interface (e.g., tunnel termination gateway (TTG) in 3GPP UMTS network(s) (not shown)) which can facilitate packetized communication with disparate wireless network (s), such as network platform and associated radio access network, Wi-Fi networks. It should be further appreciated that the packetized communication can include multiple flows that can be generated through service (e.g., provisioning) and application server(s) 1060. It is to be noted that in 3GPP UMTS network(s), PS gateway node(s) 1022 (e.g., GGSN) and tunnel interface (e.g., TTG) comprise a packet data gateway (PDG).

The mobile network platform 1010 also includes serving node(s) 1070 that convey the various packetized flows of data streams (e.g., content(s) or signaling directed to a subscribed data), received through PS gateway node(s) 1022. As an example, in a 3GPP UMTS network, serving node(s) 1070 can be embodied in serving GPRS support node(s) (SGSN).

Server(s) 1060 in mobile network platform 1010 can execute numerous applications (e.g., location services, online gaming, wireless banking, wireless device management . . . )

that can generate multiple disparate packetized data streams or flows, and manage (e.g., schedule, queue, format . . . ) such flows. Such application(s), for example can include add-on features to standard services provided by mobile network platform 1010. Data streams (e.g., content(s) or signaling directed to a file) can be conveyed to PS gateway node(s) 1022 for authorization/authentication and initiation of a data session, and to serving node(s) 1070 for communication thereafter.

Server(s) 1060 can also effect security (e.g., implement one or more firewalls) of mobile network platform 1010 to ensure network's operation and data integrity in addition to authorization and authentication procedures that CS gateway node(s) 1012 and PS gateway node(s) 1022 can enact. Moreover, server(s) 1060 can provision services from external network(s), e.g., WAN 1030, or Global Positioning System (GPS) network(s) (not shown). It is to be noted that server(s) 1060 can include one or more processor configured to confer at least in part the functionality of macro network platform 1010. To that end, the one or more processor can execute code instructions stored in memory 1020, for example. It is should be appreciated that server(s) 1060 can include a content manager 1080.

In example wireless environment 2200, memory 2230 can store information related to operation of mobile network platform 2210. Information can include content(s) directed to WDMF received from various sources of content(s), as described herein, subscriber account(s) 327 and associated credential(s), and delivery settings(s) 329, additional subscriber data; pricing schemes, e.g., promotional rates, flat-rate programs, couponing campaigns; technical specification (s) of served WDMFs; and so forth. Memory 2230 can also store information from at least one of telephony network(s) 2240, WAN 2250, LAN 2270, SS7 network 2260, or service network(s) 2280.

In view of the example systems described above, example methodologies such as depicted in FIG. 4 can be implemented in accordance with the disclosed subject matter and can be better appreciated with reference to flowcharts described herein. For purposes of simplicity of explanation example methods are presented and described as a series of acts; however, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream.

The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   facilitating, by a wireless device comprising a processor, establishing an instant message communication session, wherein the instant message communication session comprises a first portion and a second portion that are part of a same instant message;
   determining, by the wireless device, a location of the wireless device;
   identifying, by the wireless device, the first portion of the instant message communication session based on the location of the wireless device;
   identifying, by the wireless device, that the first portion of the instant message is to be persisted; and
   in response to a deletion of the instant message communication session, persisting, by the wireless device, the first portion and deleting, by the wireless device, the second portion.

2. The method of claim 1, further comprising marking, by the wireless device, the first portion of the instant message communication session with a character indicating the first portion is to be persisted.

3. The method of claim 1, further comprising marking, by the wireless device, the first portion of the instant message communication session, as a result of a biometric operation, indicating the first portion of the instant message communication session is to be persisted.

4. The method of claim 1, wherein the generating the instant message communication session includes generating image data.

5. The method of claim 1, wherein the generating the instant message communication session includes receiving the first portion of the instant message communication session from a first source and receiving the second portion of the instant message communication session from a second source.

6. The method of claim 1, further comprising sending, by the wireless device, the first portion of the instant message communication session for storage on a mobile device in response to the identifying that the first portion of the instant message communication session is to be persisted.

7. The method of claim 1, further comprising sending, by the wireless device, the first portion of the instant message communication session for storage on a remote server in response to the identifying that the first portion of the instant message communication session is to be persisted.

8. The method of claim 1, wherein the identifying includes identifying the first portion of the instant message communication session that is to be persisted according to a rule.

9. The method of claim 1, further comprising determining, by the wireless device, the first portion of the instant message communication session including receiving input relating to operation of the wireless device.

10. The method of claim 9, wherein the receiving the input includes receiving classifier input from a classifier identifying a pattern of usage of the wireless device.

11. The method of claim 1, wherein the determining the location of the wireless device includes receiving global positioning system input relating to a positional operation of the wireless device.

12. A wireless device, comprising:
    a memory to store computer-executable instructions; and
    a processor, communicatively coupled to the memory, which facilitates execution of the computer-executable instructions to perform operations, comprising:
    presenting an instant message communication session, wherein the communication session comprises a first portion and a second portion that are part of a same instant message;
    identifying that the first portion is to be persisted based on policy data representing a policy identifying the first portion to be persisted based on a determined location of the wireless device; and
    in response to an indication to delete the instant message communication session, persisting the first portion in memory and deleting the second portion.

13. The wireless device of claim 12, wherein the policy identifying the first portion is based on a predefined criterion relating to a notification received from a device located at the determined location.

14. The wireless device of claim 12, wherein the operations further comprise adding a text symbol to the first portion to indicate the first portion is to be persisted.

15. A non-transitory computer-readable storage medium having computer-executable instructions that, in response to execution, cause a computing system including a processor to perform operations, comprising:
    facilitating conducting an instant message communication session, wherein the instant message communication session comprises a first portion and a second portion that are part of a same instant message;
    determining a location of the computing system;
    identifying the first portion of the instant message based on the location; and
    identifying by the computer system, that the first portion of the instant message is to be persisted;
    in response to receiving an instruction to delete the instant message communication session, persisting the first portion of the instant message and deleting the second portion of the instant message.

16. The non-transitory computer-readable storage medium of claim 15, wherein the instant message communication session includes audio data.

17. The non-transitory computer-readable storage medium of claim 15, wherein the instant message communication session includes video data.

18. The non-transitory computer-readable storage medium of claim 15, wherein the instant message communication session includes text data.

19. The method of claim 1, wherein the identifying the first portion of the instant message communication includes identifying the first portion of the instant message communication according to a policy associated with the location of the wireless device.

20. The wireless device of claim 12, wherein the determined location of the wireless device is defined by a global positioning system input.

\* \* \* \* \*